US008600763B2

(12) United States Patent
Brush et al.

(10) Patent No.: US 8,600,763 B2
(45) Date of Patent: Dec. 3, 2013

(54) SYSTEM-INITIATED SPEECH INTERACTION

(75) Inventors: Alice Jane Bernheim Brush, Bellevue, WA (US); Paul Johns, Tacoma, WA (US); Jen Anderson, Redmond, WA (US); Connie Missimer, Seattle, WA (US); Seung Yang, Woodinville, WA (US); Jean Ku, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 12/794,068

(22) Filed: Jun. 4, 2010

(65) Prior Publication Data

US 2011/0301958 A1 Dec. 8, 2011

(51) Int. Cl.
*G10L 21/00* (2013.01)

(52) U.S. Cl.
USPC .......................................... 704/275; 704/276

(58) Field of Classification Search
USPC ................................... 704/270–276
See application file for complete search history.

(56) References Cited

U.S. PATENT DOCUMENTS

| | | | |
|---|---|---|---|
| 5,602,963 A | 2/1997 | Bissonnette et al. | |
| 6,144,938 A * | 11/2000 | Surace et al. | 704/257 |
| 6,519,479 B1 | 2/2003 | Garudadri et al. | |
| 6,650,735 B2 | 11/2003 | Burton et al. | |
| 6,965,863 B1 * | 11/2005 | Zuberec et al. | 704/270 |
| 6,973,166 B1 | 12/2005 | Tsumpes | |
| 7,080,014 B2 * | 7/2006 | Bush et al. | 704/275 |
| 7,254,543 B2 * | 8/2007 | Ibaraki et al. | 704/275 |
| 7,518,631 B2 | 4/2009 | Hershey et al. | |
| 8,234,119 B2 * | 7/2012 | Dhawan et al. | 704/270 |
| 2002/0191754 A1 | 12/2002 | Liu et al. | |
| 2007/0136752 A1 * | 6/2007 | Sanders | 725/46 |
| 2009/0286514 A1 | 11/2009 | Lichorowic et al. | |
| 2011/0270615 A1 * | 11/2011 | Jordan et al. | 704/275 |

OTHER PUBLICATIONS

SnapFiles, Responding Heads freeware download and review—Control your PC via voice commands, WebAttack Inc., Feb. 2, 2007, <http://www.snapfiles.com/get/respondingheads.html>.
e-Speaking.com, Voice recognition software—(Speech recognition), retrieved Apr. 6, 2010 from <http://e-speaking.com>.
Microsoft Corporation, Voice command tips and tricks I Smartphone and pocket PC mobile device, retrieved Apr. 6, 2010 from <http://www.microsoft.com/windowsmobile/en-us/help/more/voice-command-tips.mspx>.

* cited by examiner

*Primary Examiner* — Abul Azad
(74) *Attorney, Agent, or Firm* — Lyon & Harr, LLP; Richard T. Lyon

(57) ABSTRACT

Whenever an event occurs on a computing system which will accept a response from a user of the system, the system automatically determines whether or not to enable speech interaction with the system for the event response. Whenever speech interaction is enabled with the system for the event response, the system provides a notification to the user which informs the user of the event and their options for responding thereto, where these options include responding verbally. Whenever the user responds within a prescribed period of time via a voice command (VC), the system attempts to recognize the VC. Whenever the VC is successfully recognized, the system responds appropriately to the VC.

18 Claims, 6 Drawing Sheets

SYSTEM-INITIATED SPEECH INTERACTION

BACKGROUND

Speech recognition (SR) is a commonly used term for a computing technology that automatically recognizes spoken words. Given a computing system that employs SR technology, once the system recognizes a particular spoken word or a particular sequence of two or more spoken words, the system can automatically perform a prescribed action based on the recognized word(s). The system can also convert the recognized word(s) to text. One form of SR is generally speaker-independent and thus can recognize the voices of a plurality of different speakers. The term "voice recognition" is commonly used to refer to another form of SR where the computing system is trained to the voice of a particular speaker. Generally speaking, compared to the speaker-independent form of SR, voice recognition can more accurately recognize what is being said and can recognize a larger vocabulary of words. SR technology has been employed to make a variety of applications "hands-free" or at least partially hands free, thus reducing human workload in these applications. Examples of such applications include medical and legal transcription, vehicle and aircraft control, home automation, robotics and telephonic call centers.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

System-initiated speech interaction framework embodiments described herein generally involve initiating speech interaction (SI) with a computing system. In an exemplary embodiment, whenever an event occurs on the system which will accept a response from a user of the system, the system automatically determines whether or not to enable SI with the system for the event response. Whenever SI is enabled with the system for the event response, the system provides a notification to the user which informs the user of the event and their options for responding thereto, where these options include responding verbally. Whenever the user responds to the notification within a prescribed period of time via a voice command (VC), the system attempts to recognize the VC. Whenever the VC is successfully recognized, the system responds appropriately to the VC.

DESCRIPTION OF THE DRAWINGS

The specific features, aspects, and advantages of the system-initiated speech interaction (SISI) framework embodiments described herein will become better understood with regard to the following description, appended claims, and accompanying drawings where:

DETAILED DESCRIPTION

Figure 1:
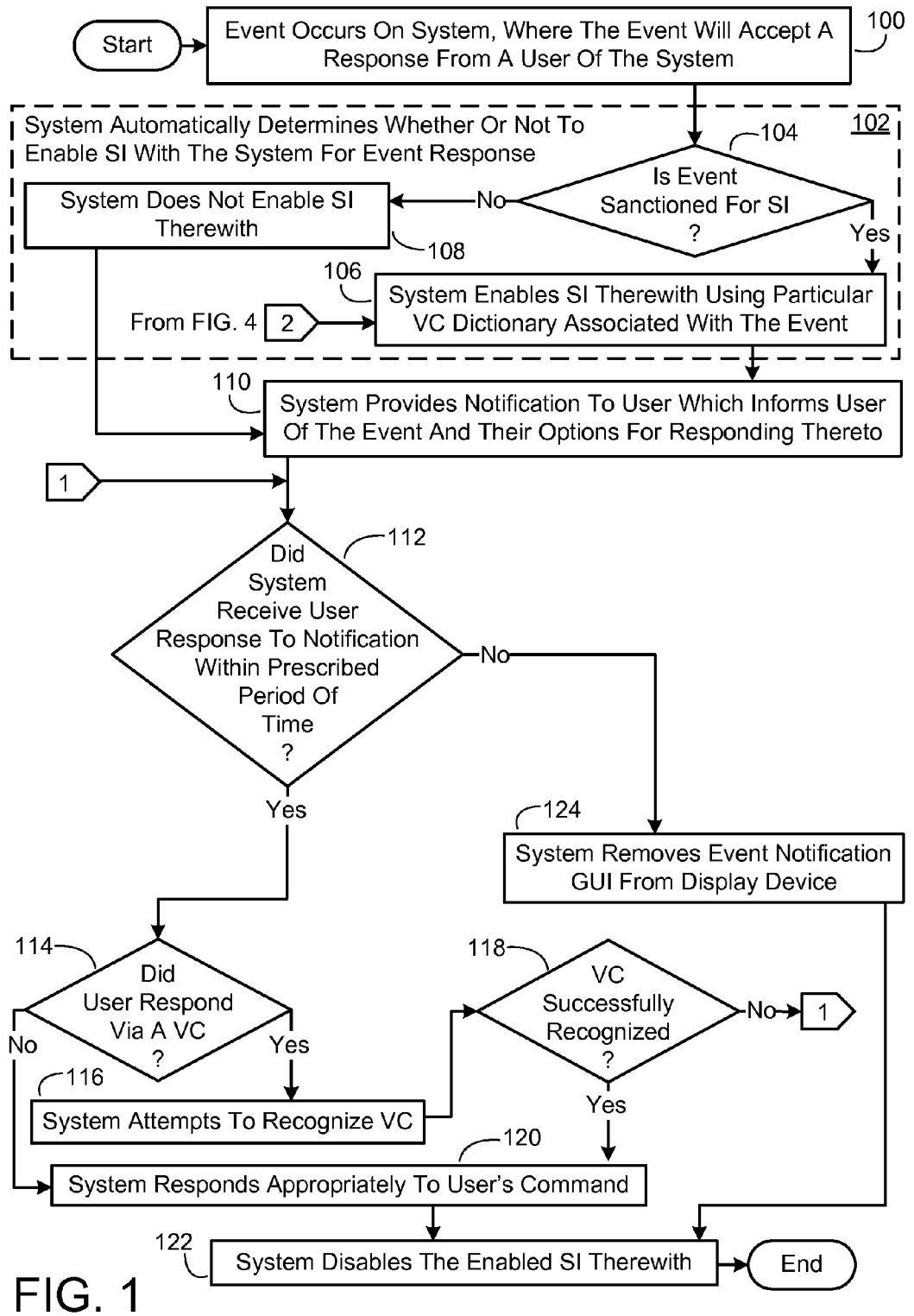
FIG. 1 is a flow diagram illustrating an exemplary embodiment, in simplified form, of a process for initiating speech interaction (SI) with a computing system.

In the following description of system-initiated speech interaction (SISI) framework embodiments reference is made to the accompanying drawings which form a part hereof, and in which are shown, by way of illustration, specific embodiments in which the SISI framework can be practiced. It is understood that other embodiments can be utilized and structural changes can be made without departing from the scope of the SISI framework embodiments.

The term "user" is used herein to refer an individual who is using a computing system (hereafter also simply referred to as a "system"). The term "speaker" is used herein to refer to a user who speaks one or more words. The term "voice command (VC)" is used herein to refer to either a single word or a sequence of two or more words that are spoken into a sound input device that is attached to a system by a user of the system in an attempt to verbally command the system to perform a particular action. The term "voice command (VC) dictionary" is used herein to refer to a prescribed set of one or more VCs that a system will attempt to recognize using speech recognition (SR) technology that includes an SR engine (i.e., an SR application program). The terms "sector" and "field" are used herein to refer to a partitioned region of a system display device (such as a computer monitor among other things) in which a particular type of graphical user interface (GUI) and/or information can be displayed, or a particular action can be performed by a user, where the GUI/information/action are generally associated with a particular application program that is running on the system. This information includes online documents, among other things, where these documents can include a wide variety of different types of information such as text, images, animations, audio, video, web hyperlinks, and the like. The term "manually select" is used herein to refer to either a user action of manually pushing a physical button on a GUI selection device such as a computer mouse and the like (i.e., manually "clicking" such as button), or a user action of physically touching an icon, button, menu item, and the like within a GUI using either one or more fingers, or a digital pen. The term "manually-selectable (MS) virtual element" is used herein to refer to an icon, button, menu item, and the like within a GUI that a user can manually select. The term "voice-selectable (VS)

virtual element" is used herein to refer to an icon, button, menu item, and the like within a GUI that a user can verbally select by speaking a VC.

1.0 System-Initiated Speech Interaction (SISI)

Generally speaking, the term "speech interaction (SI)" is used herein to refer to a user interacting with a system that employs SR technology using VCs. More particularly, in an exemplary scenario the term "speech interaction (SI)" is used herein to refer to a user inputting a VC into a system that employs SR technology and the system attempting to recognize the VC. As described heretofore, if the system is able to successfully recognize the VC, the system can automatically perform one or more prescribed actions in response to the recognized VC.

It is beneficial for a system that employs SR technology to have a facility for automatically enabling SI with the system (i.e., automatically starting the SR engine) and automatically disabling SI with the system (i.e., automatically stopping the SR engine) in the appropriate circumstances. In contrast to relying on a user of the system to perform an explicit action to enable SI with the system, and then perform another explicit action to disable SI with the system (a scenario which can be thought of as user-initiated SI), the SISI framework embodiments described herein generally provide for system-initiated (i.e., automatic) SI with a system.

The SISI framework embodiments described herein are advantageous for a variety of reasons including, but not limited to, the following. As will be appreciated from the more detailed description that follows, a user of a system does not have to remember to perform an explicit action (such as saying "start listening," or manually pushing a physical system button, or manually selecting a MS virtual element in a GUI) each time they want to initiate their SI with the system. Similarly, the user does not have to remember to perform another explicit action (such as saying "stop listening," or manually pushing a physical system button, or manually selecting a MS virtual element in the GUI) each time they want to end their SI with the system. The SISI framework embodiments also conserve computing bandwidth on the system by automatically enabling speed interaction with the system in appropriate circumstances where the user might find SI beneficial, and subsequently automatically disabling SI with the system in other appropriate circumstances (examples of such appropriate enabling and disabling circumstances will be described in more detail hereafter). The SISI framework embodiments are also compatible with any conventional SR engine.

Additionally, the SISI framework embodiments described herein increase the user's overall productivity by allowing the user to use their voice to perform certain actions on the system in parallel with using their keyboard and mouse to perform other actions on the system. By way of example but not limitation, when a system event occurs while the user is working on one or more tasks on a display device that is attached to the system (hereafter simply referred to as the "system's display device"), and the event will accept a response from the user, the user can save time by responding to the event using a VC rather than having to move their GUI selection device away from the task(s) they are working on and into another sector on the display device in order to manually respond to the event. Such use of a VC is far less distracting to the user in that they don't have to stop working on the task(s) in order to respond to the event. As will be appreciated from the more detailed description that follows, whenever SI is enabled with the system, the user can provide input to the system either verbally or manually. In other words, in the SISI framework embodiments having SI enabled with the system does not preclude the user's ability to employ non-voice methods of providing input to the system, but rather augments these methods by adding another input method that the user can choose to use or not as they see fit.

Additionally, in the SISI framework embodiments described herein each time SI is automatically enabled on the system a VC dictionary is initiated, where this dictionary includes a prescribed small number of VCs which are specifically tailored to a particular system event which caused SI to be enabled (i.e., different dictionaries can be initiated for different system events). This is advantageous in that it dramatically increases the system's ability to accurately recognize the VCs in the dictionary and respond accordingly, and also minimizes the number of false positive recognitions of spoken words.

As is appreciated in the current art of computing system operating environments, one or more different sectors can be displayed on a system's display device, where the sectors can be layered or overlapped one on top of another, each sector is generally associated with a particular application program that is running on the system. The term "input focus" is used hereafter to refer to the particular sector that the user's input to the system is directed toward at a particular point in time. In conventional system operating environments, although a plurality of different application programs can be running concurrently on the system, a user's input to the system is generally directed toward just one particular sector at any given point in time. It is thus appreciated that conventional system operating environments provide for single input focus. In other words, wherever the user manually selects on the display device has the input focus, where the input is generally limited to a single modality such as voice, or a GUI selection device, or the like. Therefore, if the user manually selects a particular MS virtual GUI element that is displayed within a particular sector, then the selection will be directed toward the particular application program that is associated with the sector. Similarly, if the user manually selects a particular part of a document that is displayed within in a particular sector, and the user then starts typing on a keyboard which is attached to the system, then whatever the user types will be input into the particular part of the document. Furthermore, if the user initiates speech interaction on the system (i.e., the user switches their input modality over to voice), then their voice input will be directed toward the application program associated with the sector that is active when speech interaction is initiated.

The term "manual input focus" is used hereafter to refer to a particular sector that the user's manual input (i.e., user input which is generated by physically using a manual input device that is attached to the system such as those described herein) is directed toward at a particular point in time. The term "voice input focus" is used hereafter to refer to one or more sectors that the user's voice input (i.e., user input which is generated by speaking into a sound input device that is attached to the system such as those described herein) is directed toward at a particular point in time.

Generally speaking, the SISI framework embodiments described herein provide for "dual input focus" which allows a system to have both voice input focus and manual input focus at the same time. Either a common sector can have both voice input focus and manual input focus, or one sector can have manual input focus and one or more other sectors can have voice input focus. By way of example but not limitation, when a system automatically enables SI therewith in the manner described herein based on the occurrence of an event on the system which is sanctioned for SI, the event notification that is provided to the user will have voice input focus (i.e., the system will automatically direct the user's voice input to the event notification GUI that is displayed within a new sector on the system's display device). Whatever sector on the display device the user was working in when the event occurred will continue to have manual input focus (i.e., the system will continue to direct the user's input from their manual input device to the sector they were working in when the event occurred). The user can move the manual input focus over to the new sector that is displaying the event notification GUI by manually selecting the new sector, resulting in the new sector having both voice input focus and manual input focus at the same time.

The dual input focus feature of the SISI framework embodiments described herein is advantageous for various reasons including, but not limited to, the following. In an exemplary situation where an event occurs on the system while the user is typing a document in a particular sector on the display device, and the event is sanctioned for speech interaction, the user can choose to respond to the event notification using a VC while they continue typing the document. Thus, the user is not distracted from their document typing task by having to stop typing, move the manual input focus over to the event notification GUI (which can be done by manually selecting the GUI), and then manually selecting an MS virtual element in the GUI in order to respond to the event notification as they see fit.

As mentioned heretofore and as will be described in more detail hereafter, it is possible for a plurality of sectors to share voice input focus at the same time. The SISI framework embodiments include a mechanism for visually distinguishing each sector on the display device that has voice input focus at any given point in time. The SISI framework embodiments also include a mechanism for providing visual feedback to the user when a VC that they speak is successfully recognized by the system. The SISI framework embodiments also include a mechanism for allowing the user to respond to the event notification GUI either verbally or manually.

FIG. 1 illustrates an exemplary embodiment, in simplified form, of a process for initiating SI with a computing system. As exemplified in FIG. 1, the process starts in block 100 with an event occurring on the system (hereafter also referred to as a "system event"), where the event will accept a response from a user of the system. As will be described in more detail hereafter, such an event can be generated automatically by an application program that is running on the system, or such an event can be generated by particular types of user activity on the system. Since a typical system can have a plurality of different application programs running concurrently thereon, such an automatically generated event can occur while the user is using the system to work on one or more particular tasks in a given sector on the system's display device (such as reading or editing a document, searching for information on the Internet, reading or writing an email, managing files on the system, and the like). After such an event occurs (block 100), the system automatically determines whether or not to enable SI with the system for the event response (block 102), where this automatic determination occurs in the following manner. The system first determines whether or not the event that just occurred (herein also referred to as "the current event") is sanctioned for SI (block 104). Exemplary system events that can be sanctioned for SI and exemplary ways in which such sanctioning can be performed are described in more detail hereafter. Whenever the system determines that the event that just occurred is sanctioned for SI (block 104, Yes), the system will enable SI therewith using a particular VC dictionary that is associated with the event (block 106). Whenever the system determines that the event that just occurred is not sanctioned for SI (block 104, No), the system will not enable SI therewith (block 108).

Figure 2:
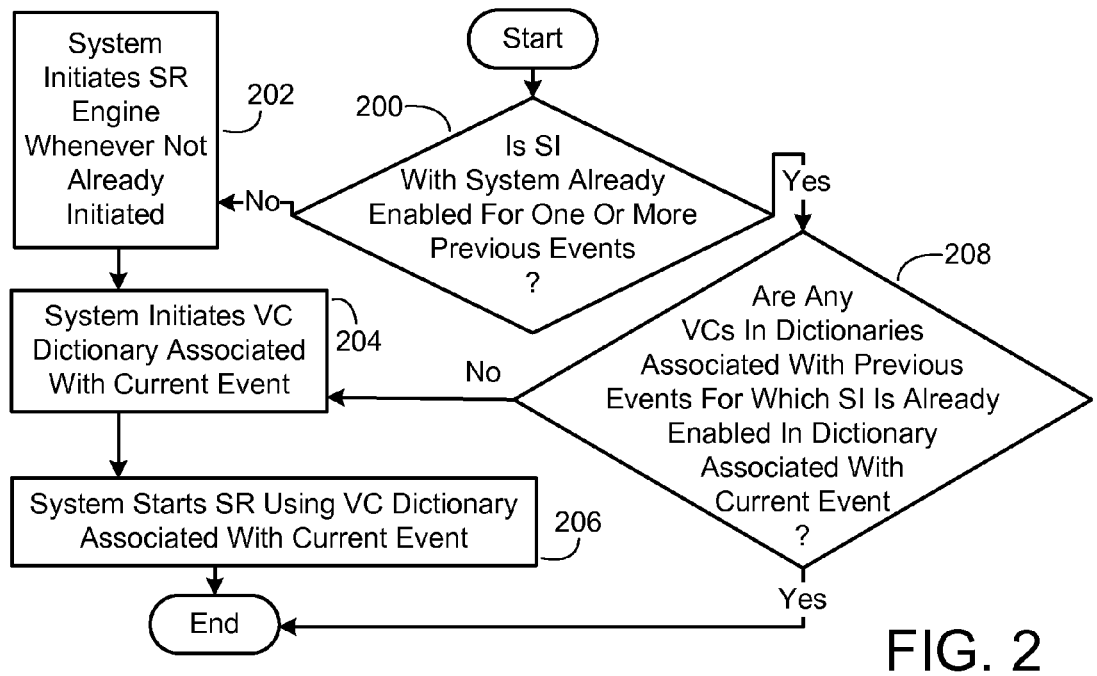
FIG. 2 is a flow diagram illustrating an exemplary embodiment, in simplified form, of a process for enabling SI with the system using a particular voice command (VC) dictionary.

FIG. 2 illustrates an exemplary embodiment, in simplified form, of a process for enabling SI with the system using the particular VC dictionary that is associated with the system event. As exemplified in FIG. 2, the process starts in block 200 with the system determining whether or not SI with the system is already enabled for one or more previous events. Whenever the system determines that SI with the system is not already enabled for one or more previous events (block 200, No), the system will initiate an SR engine whenever it is not already initiated (block 202). The system then initiates the VC dictionary that is associated with the current event (block 204). Finally, the system starts SR using this dictionary (block 206).

Referring again to FIGS. 1 and 2, a subsequent system event which is sanctioned for SI can occur (blocks 100 and 104) while SI is enabled with the system for the current event (block 106). This situation is addressed as follows. Whenever the system determines that SI with the system is already enabled for one or more previous events (block 200, Yes), and the system determines that no VCs in the VC dictionaries associated with the previous events for which SI is already enabled are in the VC dictionary associated with the current event (block 208, No), the system will simply initiate the VC dictionary that is associated with the current event (block 204) and start SR using this dictionary (block 206). The system's response to the case where one or more VCs in the VC dictionaries associated with the previous events for which SI is already enabled are in the VC dictionary associated with the current event (block 208, Yes) will be described in more detail hereafter.

Referring again to FIG. 1, once the system has determined whether or not to enable SI with the system for the event response (block 102), the system provides a notification to the user which informs the user of the system event that just occurred and their options for responding to the event (block 110), where these options include responding verbally whenever SI is enabled with the system for the event response. The event notification facilitates the user's response to the event that just occurred. As such, the event notification is tailored to the particular event that just occurred and the user responses to this event that are allowed by the system. The event notification also takes into account any previous system events that occurred for which SI is already enabled.

Figure 3:
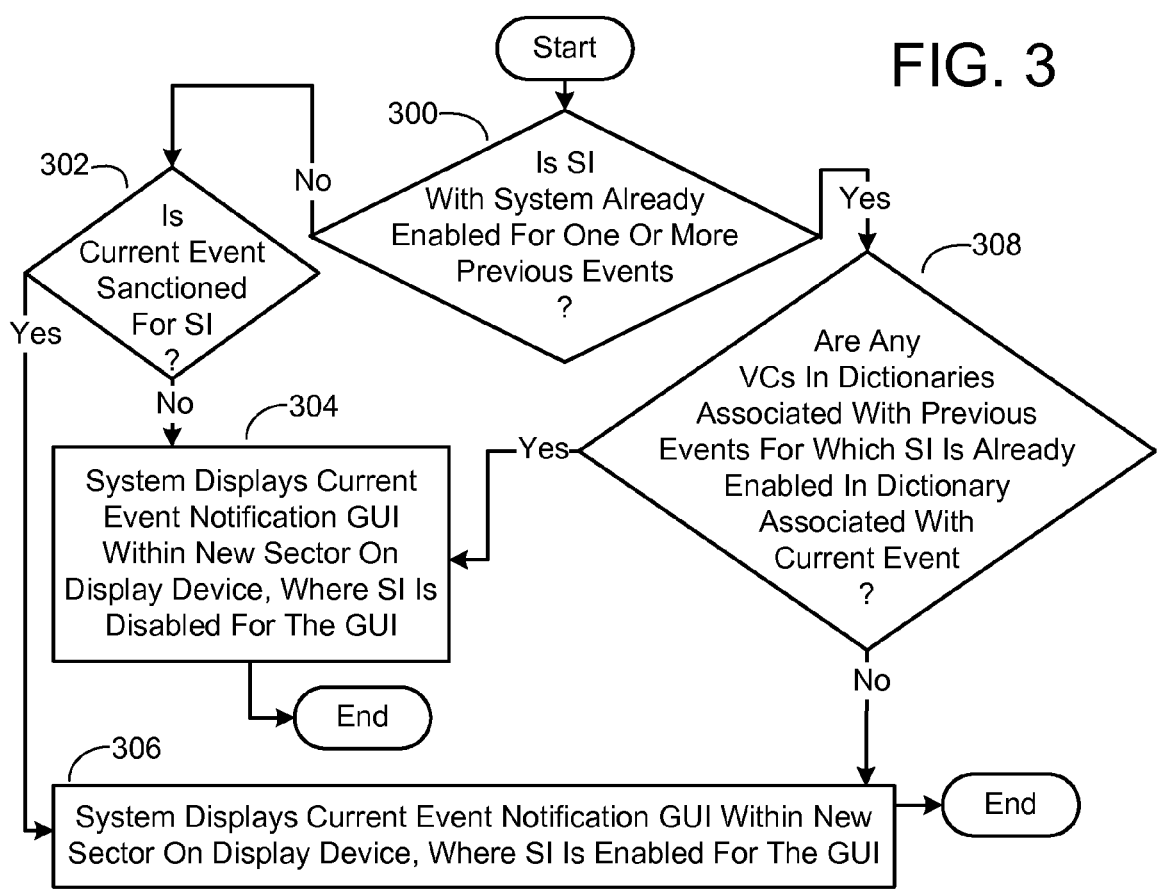
FIG. 3 is a flow diagram illustrating an exemplary embodiment, in simplified form, of a process for providing a notification to a user which informs the user of a system event that just occurred and their options for responding thereto.

FIG. 3 illustrates an exemplary embodiment, in simplified form, of a process for providing a notification to the user which informs the user of the system event that just occurred and their options for responding thereto. As exemplified in FIG. 3, the process starts in block 300 with the system determining whether or not SI with the system is already enabled for one or more previous events. Whenever the system determines that SI with the system is not already enabled (block 300, No), the system will then determine whether or not the current event is sanctioned for SI (block 302). Whenever the system determines that the current event is not sanctioned for SI (block 302, No), the system will finally display an event notification GUI for the current event within a new sector on the system's display device, where SI is disabled for the GUI (block 304). In other words, the GUI displayed in block 304 does not have voice input focus and thus limits the user to inputting their response manually. Whenever the system determines that the current event is sanctioned for SI (block 302, Yes), the system will finally display an event notification GUI for the current event within a new sector on the display device, where SI is enabled for the GUI (block 306) and the GUI thus includes one or more of the VCs that are in the VC dictionary that is associated with the current event. In other words, the GUI displayed in block 306 has voice input focus (and thus permits the user to input their response verbally) and can also have manual input focus whenever the user manually selects the new sector (and thus can also permit the user to input their response manually).

Referring again to FIGS. 1 and 3, as noted heretofore a subsequent system event which is sanctioned for SI can occur (blocks 100 and 104) while SI is enabled with the system for the current event (block 106). This situation is addressed as follows. Whenever the system determines that SI with the system is already enabled for one or more previous events (block 300, Yes), and the system determines that no VCs in the dictionaries that are associated with these previous events are in the dictionary that is associated with the current event (block 308, No), the aforementioned action of block 306 will be performed. In this particular case the current event notification GUI in the new sector will share voice input focus with the one or more previous event notification GUIs that are associated with these previous events and are already displayed in other sectors on the display device. Any of these event notification GUIs can also have manual input focus whenever the user manually selects them. Whenever the system determines that one or more VCs in a dictionary associated with a previous event for which SI is already enabled are in the dictionary that is associated with the current event (block 308, Yes), the aforementioned action of block 304 will be performed. In this particular case the previous event notification GUI will retain the voice input focus.

Referring again to FIG. 1, once the event notification has been provided to the user (block 110), the system waits a prescribed period of time to receive a user response to the event notification (block 112). As will be described in more detail hereafter, this period of time is determined by the system in various ways depending on the specific system event that just occurred. It is noted that during this period of time the user may continue using the system to work on whatever tasks they were working on when the event occurred. Whenever the system does receive a user response to the event notification within the prescribed period of time (block 112, Yes), and whenever the user's response is a voice command (block 114, Yes), the system will attempt to recognize the VC (block 116) using the SR engine that is running on the system. Whenever the SR engine successfully recognizes the VC (block 118, Yes), the system will respond appropriately to the user's VC (block 120), and finally, the system will disable the enabled SI therewith (block 122). Whenever the system does not receive a user response to the event notification within the prescribed period of time (block 112, No), the system will remove the event notification GUI from the display device (block 124) (i.e., the system will close the new sector the GUI is displayed in), and finally, the system will disable the enabled SI therewith (block 122).

Referring again to FIG. 1, whenever the SR engine does not successfully recognize the VC (block 118, No), the system will continue to wait the prescribed period of time to receive another user response to the event notification (block 112). Whenever the user responds to the event notification within the prescribed period of time (block 112, Yes), and whenever the user responds via a non-voice command (block 114, No) (i.e., the user inputs their response manually), the system will respond appropriately to the user's non-voice command (block 120), and finally, the system will disable the enabled SI therewith (block 122).

Figure 4:
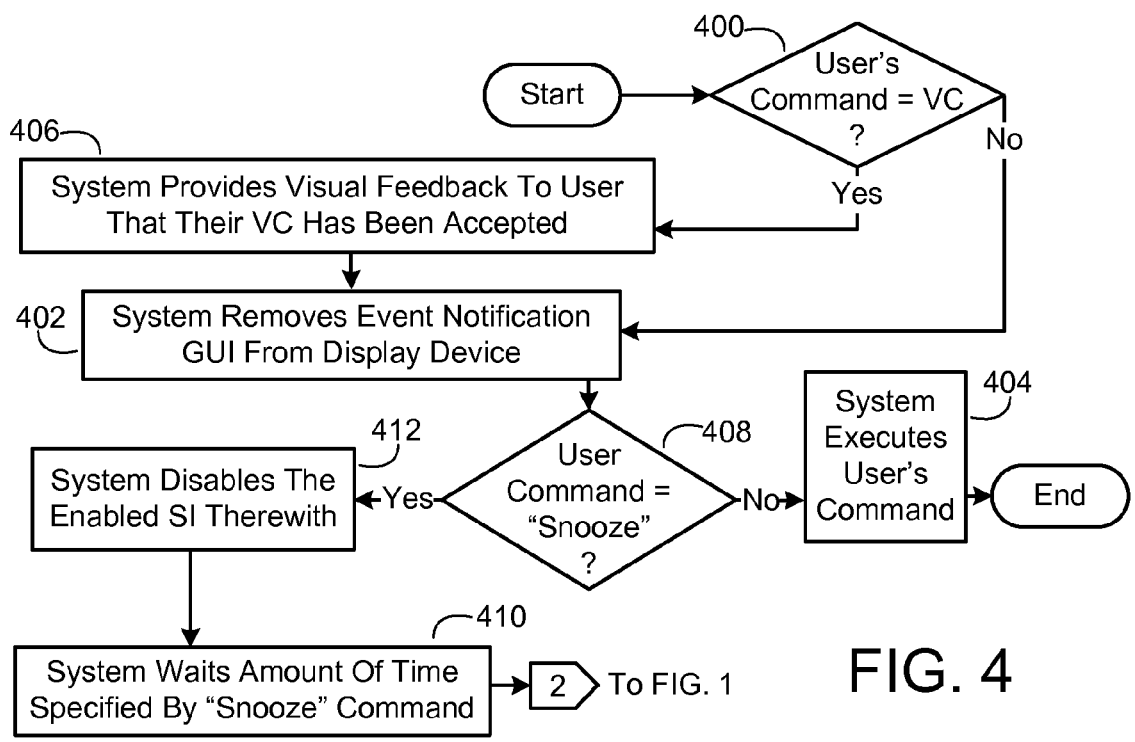
FIG. 4 is a flow diagram illustrating an exemplary embodiment, in simplified form, of a process for responding appropriately to a user command that is received by the system.

FIG. 4 illustrates an exemplary embodiment, in simplified form, of a process for responding appropriately to either the user's VC when it is successfully recognized by the SR engine, or the user's manually input command. As exemplified in FIG. 4 and referring again to FIG. 1, the process starts in block 400 as follows. Whenever the user command received by the system is a VC (block 400, Yes), the system will provide visual feedback to the user that their VC has been accepted (block 406). The system will then remove the event notification GUI from the display device (block 402). Whenever the user command received by the system is not a VC (block 400, No), the system will simply remove the event notification GUI from the display device (block 402).

As will be appreciated from the more detailed description of exemplary event notification GUIs that follows and referring again to FIG. 4, the VC dictionary associated with some system events can include a "snooze" VC that when spoken and successfully recognized causes the system to disable SI therewith for an amount of time which is specified by the "snooze" command. Once the event notification GUI is removed from the display device (block 402), the system determines whether or not the user command received by the system is such a "snooze" command (block 408). Whenever the user command received by the system is not a "snooze" command (block 408, No), the system will finally execute the user's command (block 404). Whenever the user command received by the system is a "snooze" command (block 408, Yes), the system will disable the enabled SI therewith (block 412), and will then wait the amount of time specified by the "snooze" command (block 410). After this amount of time has elapsed (block 410), the system again enables SI therewith using the particular VC dictionary that is associated with the event (block 106), and again provides a notification to the user which informs the user of the system event that just occurred and their options for responding to the event (FIG. 1, block 110).

Figure 5:
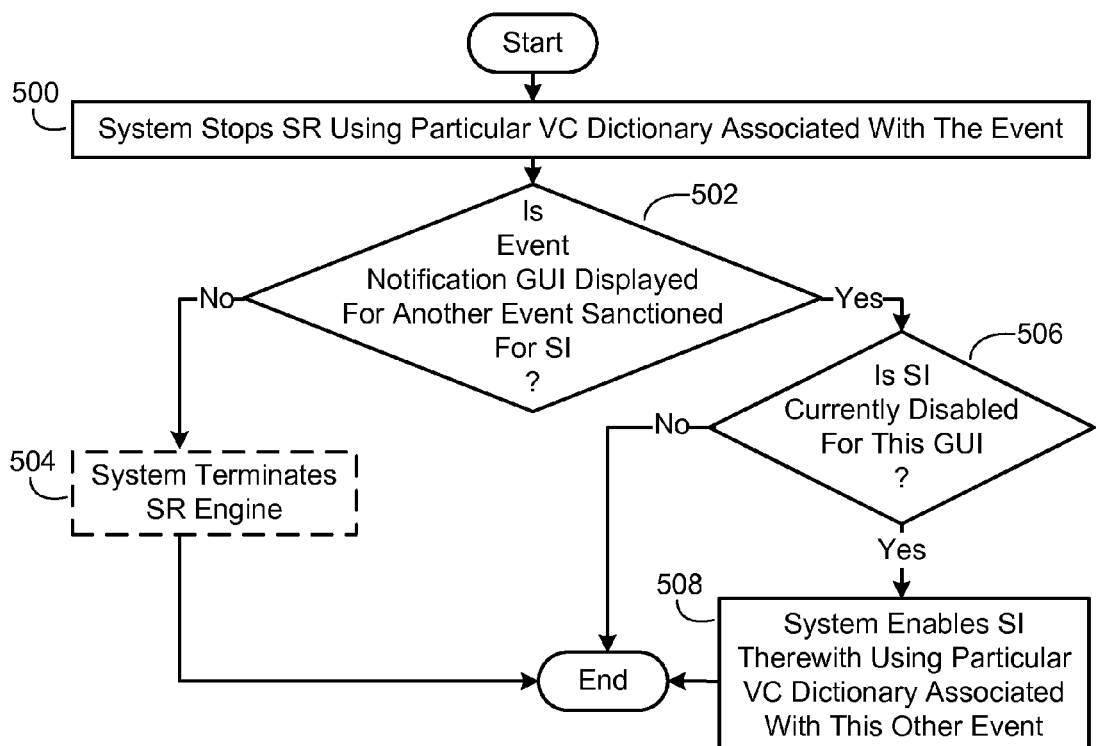
FIG. 5 is a flow diagram illustrating an exemplary embodiment, in simplified form, of a process for disabling the enabled SI with the system.

FIG. 5 illustrates an exemplary embodiment, in simplified form, of a process for disabling the enabled SI with the system. As exemplified in FIG. 5, the process starts in block 500 with the system stopping SR using the particular VC dictionary that is associated with the event. The system then determines whether or not an event notification GUI is displayed for another event that is sanctioned for SI (block 502). Whenever the system determines that an event notification GUI is displayed for another event that is sanctioned for SI (block 502, Yes), and whenever SI is currently disabled for this GUI (block 506, Yes), the system will finally enable SI therewith using the particular VC dictionary that is associated with this other event (block 508). The action of block 508 is performed using the aforementioned process exemplified in FIG. 2. Whenever the system determines that an event notification GUI is not displayed for another event that is sanctioned for SI (block 502, No), the system can finally optionally terminate the SR engine (block 504) in order to free up computing resources in the system. In the case where the SR engine is terminated, if another event occurs on the system which is sanctioned for SI, then the system will re-initiate the SR engine as part of enabling SI with the system. In the case where the SR engine is not terminated, if another event occurs on the system which is sanctioned for SI, then the system does not have to re-initiate the SR engine as part of enabling SI with the system.

1.1 Speech Interaction (SI) Events

This section describes exemplary system events that can be sanctioned for SI and exemplary ways in which such sanctioning can be performed. As described heretofore, system events which will accept a response from a user of the system can be generated automatically by an application program that is running on the system, or can be generated by particular types of user activity on the system. Generally speaking, the SISI framework embodiments described herein can support SI for any type of system event where the user might find SI efficient and thus beneficial. When the system determines that an event which occurs thereon is sanctioned for SI, the VC dictionary that is initiated will include a prescribed small number of VCs which are specifically tailored to the event that occurred.

The system events that can be sanctioned for SI can be categorized into different classes. In an exemplary embodiment of the SISI framework described herein the different classes of system events that can be sanctioned for SI include, but are not limited to, a user notification class of system events and a user activity class of system events, both of which will now be described in more detail. Whenever a system event occurs and the event belongs to the user notification class of system events, the aforementioned prescribed period of time the system will wait to receive a user response to the event notification is determined by the application program that generated the event. Whenever a system event occurs and the event belongs to the user activity class of system events, this period of time will not terminate until the system receives a user response to the event notification.

The user notification class of system events includes events which are generated automatically by an application program that is running on the system. Generally speaking, the SISI framework embodiments described herein can support SI for any system event that is generated automatically by any application program. Examples of such events that can be sanctioned for SI include, but are not limited to, an email toast, a calendar reminder and an instant message (IM) toast. As is appreciated in the art of computing technology, an email toast is a notification to the user which is generated automatically by an email application program that is running on the system when new email is received by the email application program. A calendar reminder is a notification to the user which is generated automatically by a calendaring application program that is running on the system when an event which is scheduled in the calendaring application program is about to occur. An IM toast is a notification to the user which is generated automatically by an instant messaging application program that is running on the system when a new IM is received by the instant messaging application program. Exemplary email, calendaring and instant messaging application programs are well known and thus need not be described at length here. It is noted that the SISI framework embodiments are compatible with any email, calendaring and instant messaging application programs.

The user activity class of system events includes events which are generated by prescribed types of user activity on the system. Generally speaking, the SISI framework embodiments described herein can support SI for any system event that is generated by any type of user activity on the system. Examples of such events that can be sanctioned for SI include user authoring activity within an authoring application program that is running on the system, user file management activity, and the like. Exemplary authoring application programs include, but are not limited to, document creation application programs, spreadsheet creation applications programs, diagram/drawing creation application programs, presentation creation application programs, and graphics/image creation application programs. Particular examples of each of these types of authoring application programs are well known and thus need not be described at length here. It is noted that the SISI framework embodiments are compatible with any authoring application programs. Exemplary types of user authoring activity and user file management activity that can be sanctioned for SI are described in more detail hereafter.

In an exemplary embodiment of the SISI framework described herein, the system has a default set of system events that are sanctioned for SI, where a default VC dictionary is associated with each of the events in this default set. A user of the system may customize this default set as follows. The user may sanction one or more additional types of system events for SI by adding them to the default set. The user may also de-sanction one or more specific system events which are currently sanctioned for SI by removing them from the default set. The user may also customize the default VC dictionary associated with any given system event as follows. The user may enable the recognition of one or more new VCs by adding them to the default VC dictionary associated with a given system event. The user may also disable the recognition of one or more existing VCs by removing them from the default VC dictionary associated with a given system event.

1.2 SISI User Interface

As described heretofore, in an exemplary embodiment of the SISI framework described herein the system visually provides a notification to the user by displaying an event notification GUI within a new sector of the system's display device. As will be appreciated from the more detailed description that follows, the GUI informs the user of a particular system event that just occurred and facilitates the user's response to the event. As such, the GUI is tailored to the particular event that just occurred and the user responses to this event that are allowed.

In the case where the event is sanctioned for SI, the event notification GUI may permit the user to input their response either manually (i.e., by using a GUI selection device) or verbally, and the GUI will generally include one or more of the VCs that are included in the VC dictionary that is associated with the event. More particularly, in one embodiment of the SISI framework the GUI can include each of these VCs. In another embodiment of the SISI framework the GUI can include a subset of these VCs. By way of example but not limitation, the GUI for a given system event can include a "snooze" VC that when spoken and successfully recognized causes the system to disable SI therewith for either a default amount of time or an amount of time which is specified elsewhere in the GUI. The VC dictionary associated with the event can include additional commands that are not displayed in the GUI, such as "snooze for five minutes," "snooze for ten minutes," "snooze for fifteen minutes," and the like. In yet another embodiment of the SISI framework, the GUI and VC dictionary can include a "more" VC that when spoken and successfully recognized causes the system to display the VCs in the dictionary that are not currently displayed. In the case where the event is not sanctioned for SI, the GUI will not permit the user to input their response verbally, and the GUI will not include any VCs. A more detailed description of exemplary event notification GUI embodiments for exemplary system events which can be sanctioned for SI will now be provided.

Figure 6:
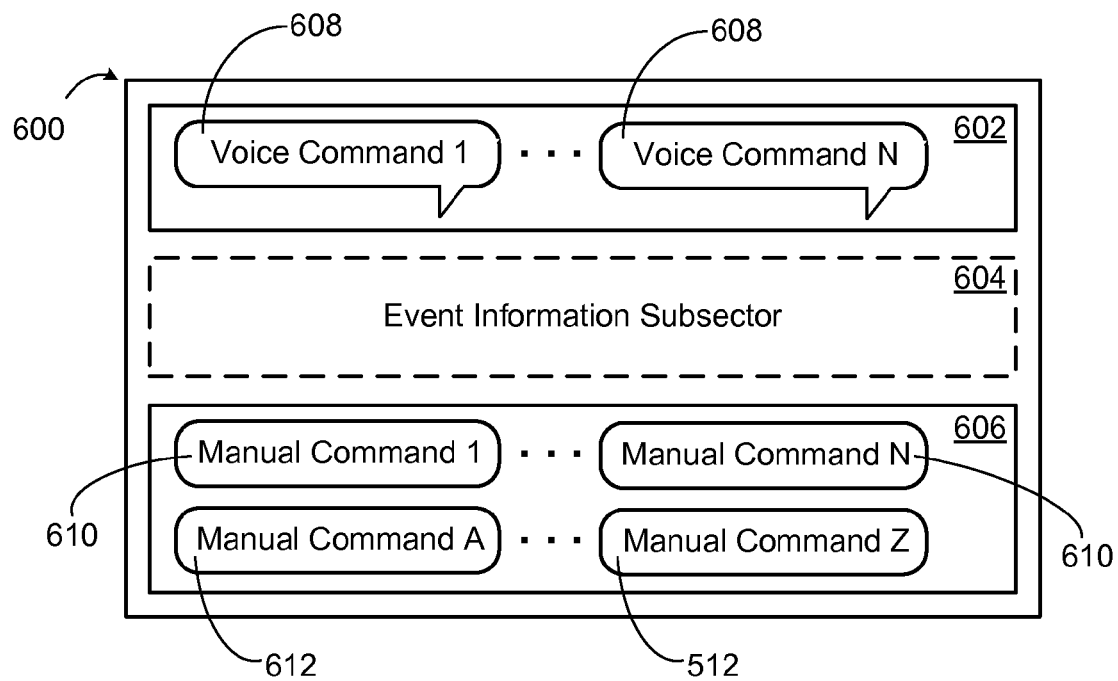
FIG. 6 is a diagram illustrating an exemplary embodiment, in simplified form, of a generalized layout for an event notification graphical user interface (GUI) for a system event that is sanctioned for SI.

FIG. 6 illustrates an exemplary embodiment, in simplified form, of a generalized layout for the aforementioned event notification GUI for a system event that is sanctioned for SI. As exemplified in FIG. 6, the GUI is displayed within a new sector 600 on the system's display device and the GUI divides this new sector into the following one or more subsectors. The new sector 600 includes a VCs subsector 602 within which is displayed one or more VS virtual elements 608, where each of the elements represents a different VC that is included in the aforementioned VC dictionary that is associated with the event, and within each of the elements is displayed the text associated with a particular VC. As described heretofore and as will be exemplified hereafter, each VC in the dictionary can be either a single word (such as "dismiss" or "snooze" or the like) or a sequence of two or more words (such as "dismiss all" or "snooze for ten minutes" or the like). Displaying the VS virtual elements 608 to the user that represent one or more of the possible, event-specific VCs is advantageous since it visually informs the user which VCs can be used to respond to the event. Therefore, the user is not burdened with having to memorize the various sets of VCs that are allowed for the various system events which can occur.

Referring again to FIG. 6, depending on the type of event that just occurred, the new sector 600 may also include an event information subsector 604 within which is displayed one or more information fields that identify the event to the user in a summary fashion. The new sector 600 may also include a manual commands subsector 606 within which is displayed a first set of one or more MS virtual elements 610. Each of the MS virtual elements 610 in this first set corresponds to a different VS virtual element 608 that is displayed in the VCs subsector 602, and provides the user with a way to activate the VC represented by its corresponding VS virtual element using a GUI selection device. Within each of the MS virtual elements 610 in the first set is displayed the same text that is displayed within its corresponding VS virtual element 608. As described heretofore, the user can choose to respond to the event notification either by speaking a VC that is displayed in one of the VS virtual elements 608, or by manually selecting one of the MS virtual elements 610. As will be exemplified hereafter, depending on the type of event that just occurred, the manual commands subsector 606 may also include a second set of one or more additional MS virtual elements 612 that represent system commands that are different than those which are included in the VC dictionary that is associated with the event.

Referring again to FIG. 6, whenever the event notification GUI displayed within the new sector 600 has voice input focus, each of the VS virtual elements 608 that are displayed within the VCs subsector will be highlighted to glow a visually recognizable color. This glow provides a visual indication to the user that SI with the GUI is enabled, draws the user's attention to the particular VCs they can choose from, and visually distinguishes these VCs from any MS virtual elements 610 which may be displayed within the manual commands subsector. In an exemplary embodiment of the SISI framework described herein, the visually recognizable color is blue. Alternate embodiments of the SISI framework are also possible where other colors are employed for the visually recognizable color. Each of the VS virtual elements 608 also has a prescribed shape which is different than the shape of any of the MS virtual elements 610 which may be displayed within the manual commands subsector, thus further distinguishing the VCs. In an exemplary embodiment of the SISI framework the prescribed shape is that of a speech bubble (also referred to in the graphic arts as a "speech balloon"). Alternate embodiments of the SISI framework are also possible where other shapes are employed for the prescribed shape. Whenever the user speaks a particular VC displayed within a VS virtual element 608 into the system's sound input device and the spoken VC is successfully recognized by the system, the system will light up the VS virtual element that represents the recognized VC for a prescribed short period of time in order to provide visual feedback to the user that their VC has been accepted. In an exemplary embodiment of the SISI framework described herein, this short period of time is two seconds. Alternate embodiments of the SISI framework are also possible where this short period of time can be either less than two seconds or more than two seconds. This lighting up of the VS virtual element can be implemented in any way which changes the look of the element such that the change is easily seen by the user. By way of example but not limitation, the color of the interior of the VS virtual element can be changed, or the font of the text within the VS virtual element can be bolded, or these two actions can be combined.

In the aforementioned case where SI is enabled with the system for two or more different system events at the same time so that two or more different event notification GUIs are displayed on the system's display device at the same time (where each of these GUIs is displayed within a different new sector on the display device, and these GUIs share voice input focus), each of the VS virtual elements that are displayed within each of these GUIs are highlighted to glow the prescribed visually recognizable color. Whenever the user speaks a particular VC displayed within a VS virtual element within a particular one of these GUIs into the system's sound input device and the spoken VC is successfully recognized by the system, the system will light up the VS virtual element that represents the recognized VC within the particular GUI for the prescribed short period of time.

Figure 7:
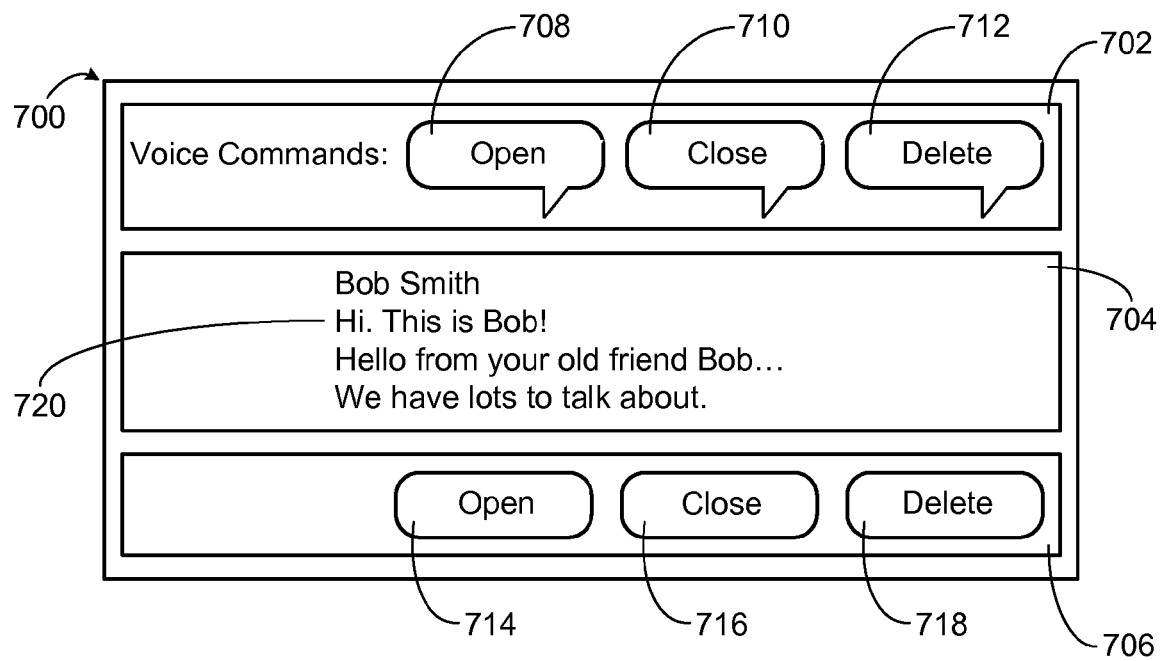
FIG. 7 is a diagram illustrating an exemplary embodiment, in simplified form, of a GUI for an email toast type of system event notification.

FIG. 7 illustrates an exemplary embodiment, in simplified form, of a GUI for an email toast type of system event notification. As exemplified in FIG. 7, the email toast notification GUI is displayed within a new sector 700 on the system's display device and the GUI divides this new sector into a VCs subsector 702, an event information subsector 704 and a manual commands subsector 706. Three different VS virtual elements are displayed within the VCs subsector 702, namely an "open" VS element 708, a "close" VS element 710 and a "delete" VS element 712. Thus, "open," "close" and "delete" are the VCs that are included in the VC dictionary that is associated with the email toast event. As exemplified in FIG. 6, the text associated with each of these VCs is displayed within its respective VS virtual element. An information field 720 that includes an opening snippet of the email that was received is displayed within the event information subsector 704. Three different MS virtual elements are displayed within the manual commands subsector 706, namely an "open" MS element 714 which corresponds to the "open" VS element 708, a "close" MS element 716 which corresponds to the "close" VS element 710, and a "delete" MS element 718 which corresponds to the "delete" VS element 712. Each of these MS elements 714/716/718 provides the user with a way to activate the VC represented by its corresponding VS virtual element 708/7/10/712 using the GUI selection device.

Referring again to FIG. 7, each of the VS virtual elements 708/710/712 is highlighted to glow the aforementioned visually recognizable color, and each of the VS virtual elements has the aforementioned prescribed shape. Whenever the user responds to the email toast notification GUI 700 by speaking a particular VC displayed within one of the VS virtual elements 708/710/712 and the spoken VC is successfully recognized by the system, the system will light up the VS virtual element that represents the recognized VC for the aforementioned prescribed short period of time. The system will then remove the email toast notification GUI 700 from the display device and execute the recognized VC. By way of example, but not limitation, if the user says "open" and it is successfully recognized by the system, the system will first light up the "open" VS virtual element 708 for the prescribed short period of time, then remove the email toast notification GUI 700 from the display device, and then open the new email that was received in the email application program in order to permit the user to respond to or manage the email as they see fit.

Figure 8:
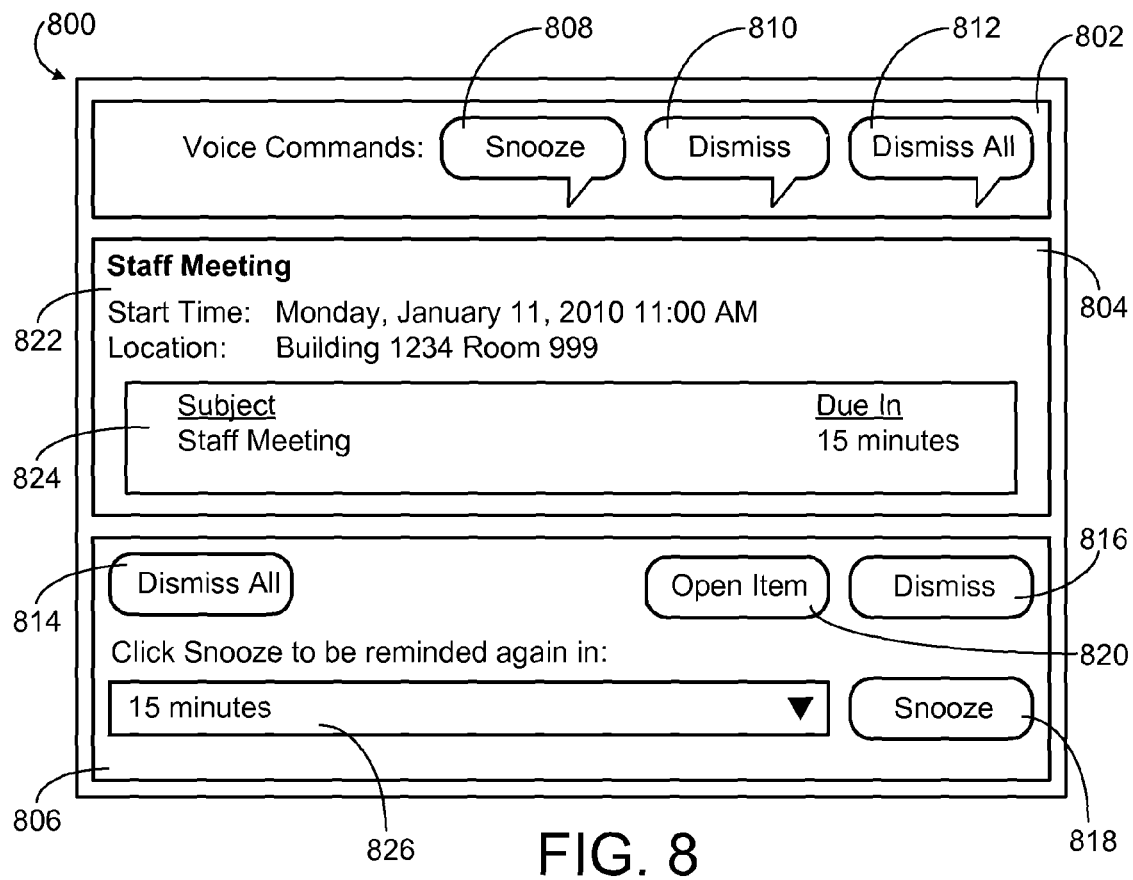
FIG. 8 is a diagram illustrating an exemplary embodiment, in simplified form, of a GUI for a calendar reminder type of system event notification.

FIG. 8 illustrates an exemplary embodiment, in simplified form, of a GUI for a calendar reminder type of system event notification. As exemplified in FIG. 8, the calendar reminder notification GUI is displayed within a new sector 800 on the system's display device and the GUI divides this new sector into a VCs subsector 802, an event information subsector 804 and a manual commands subsector 806. Three different VS virtual elements are displayed within the VCs subsector 802, namely a "snooze" VS element 808, a "dismiss" VS element 810 and a "dismiss all" VS element 812. Thus, "snooze," "dismiss" and "dismiss all" are the VCs that are included in the VC dictionary that is associated with the calendar reminder event. As exemplified in FIG. 8, the text associated with each of these VCs is displayed within its respective VS virtual element. Two information fields 822 and 844 are displayed within the event information subsector 804, where these two fields identify, in a summary fashion, the event which is scheduled in the user's calendaring application program that is about to occur. A first set of three different MS virtual elements are displayed within the manual commands subsector 806, namely a "snooze" MS element 818 which corresponds to the "snooze" VS element 808, a "dismiss" MS element 816 which corresponds to the "dismiss" VS element 810, and a "dismiss all" MS element 814 which corresponds to the "dismiss all" VS element 812. Each of these MS elements 818/816/814 provides the user with a way to activate the VC represented by its corresponding VS virtual element 808/810/812 using the GUI selection device Referring again to FIG. 8, the manual commands subsector 806 also includes a second set of two additional MS virtual elements 820 and 826 that represent system commands that are different than those which are included in the VC dictionary that is associated with the calendar reminder event. More particularly, the manual commands subsector 806 also includes an "open item" MS element 820 which provides the user with a way to open the event that is about to occur in the user's calendaring application program using the GUI selection device in order to permit the user to view more information about the event or manage the event as they see fit. The manual commands subsector 806 also includes a snooze time field 826 which allows the user to employ the GUI selection device to specify an amount of time for both the "snooze" VS element 808 and the "snooze" MS element 818.

Referring again to FIG. 8, each of the VS virtual elements 808/810/812 is highlighted to glow the aforementioned visually recognizable color, and each of the VS virtual elements has the aforementioned prescribed shape. Whenever the user responds to the calendar reminder notification GUI 800 by speaking a particular VC displayed within one of the VS virtual elements 808/810/812 and the spoken VC is successfully recognized by the system, the system will light up the VS virtual element that represents the recognized VC for the aforementioned prescribed short period of time. The system will then remove the calendar reminder notification GUI 800 from the display device and execute the recognized VC. By way of example, but not limitation, if the user says "dismiss" and it is successfully recognized by the system, the system will first light up the "dismiss" VS virtual element 810 for the prescribed short period of time, and then remove the calendar reminder notification GUI 800 from the display device. If the user says "snooze" and it is successfully recognized by the system, the system will first light up the "snooze" VS virtual element 808 for the prescribed short period of time, and then remove the calendar reminder notification GUI 800 from the display device, and then wait the aforementioned amount of time, after which the system will again enable SI therewith using the VC dictionary that is associated with the calendar reminder event, and again display the calendar reminder notification GUI 800.

The following is a description of an exemplary type of user authoring activity that can be sanctioned for SI and an exemplary SI-enabled notification GUI that can be displayed when this type of user activity occurs on the system. Consider a situation where the user is editing a document using a document creation application program that is running on the system within a particular sector on the system's display device. Whenever the user highlights a section of text in the document, the system can automatically enable SI therewith for this text highlighting event using the process described heretofore. The VC dictionary associated with this text highlighting event can include various text manipulation commands such as a "cut" command, a "copy" command, a "bold" command, an "underline" command, and an "italic" command, among others. The notification GUI (not shown) that is displayed within a new sector on the display device when this text highlighting event occurs can include a VCs subsector within which is displayed a different VS virtual element representing each of these five commands. These VS virtual elements would operate in the manner described heretofore.

The following is a description of an exemplary type of user file management activity that can be sanctioned for SI and an exemplary SI-enabled notification GUI that can be displayed when this type of user activity occurs on the system. Whenever the user manually selects a particular file that is displayed within a particular sector on the display device, the system can automatically enable SI therewith for this file selection event using the process described heretofore. The VC dictionary associated with this file selection event can include various file management commands such as a "delete" command, an "open" command, a "copy" command, and a "print" command, among others. The notification GUI (not shown) that is displayed within a new sector on the display device when this file selection event occurs can include a VCs subsector within which is displayed a different VS virtual element representing each of these four commands. These VS virtual elements would operate in the manner described heretofore.

2.0 Additional Embodiments

While the SISI framework has been described in more detail by specific reference to embodiments thereof, it is understood that variations and modifications thereof can be made without departing from the true spirit and scope of the SISI framework. By way of a general example but not limitation, the various VCs described heretofore are exemplary and additional single word and multi-word voice VCs can also be supported. By way of a more particular example but not limitation, a "switch to" set of one or more VCs can be included in the VC dictionaries associated with events that are sanctioned for SI. Given an exemplary situation where a plurality of event notification GUIs are displayed within a plurality of sectors, and each of the events that generated the GUIs is sanctioned for SI but just one of the GUIs currently has voice input focus, a "switch to" VC would allow the user switch the voice input focus from the GUI that currently has it to one of the GUIs that does not have it. As described heretofore, before the "switch to" VC is spoken by the user, the VS virtual elements displayed in the GUI that currently has voice input focus would be highlighted to glow the aforementioned visually recognizable color, and the VS virtual elements displayed in the other GUIs that do not have voice input focus would not be highlighted. After the "switch to" command is spoken by the user and successfully recognized by the system, the VS virtual elements displayed in the GUI that had voice input focus would no longer be highlighted, and the VS virtual elements displayed in the other GUI that voice input focus was switched to would be highlighted to glow the visually recognizable color.

In a more general embodiment of the SISI framework described herein, rather than displaying the VCs for an SI-sanctioned system event in separate VS virtual elements which are located within a VCs subsector of the event notification GUI as described heretofore, the VCs can be displayed within the manual commands subsector as follows (i.e., in this case the GUI would not include a separate VCs subsector). Displayed within each MS virtual element that corresponds to a VC in the VC dictionary associated with the event would be the text associated with this VC. Whenever the event notification GUI has voice input focus, each of the MS virtual elements that corresponds to a VC in the VC dictionary associated with the event would be augmented in a visually recognizable manner. This augmentation provides a visual indication to the user that SI with the GUI is enabled, and draws the user's attention to the particular MS virtual elements that are enabled for SI (i.e., the user can select one of these particular virtual elements either verbally or manually. In one embodiment of the SISI framework the augmentation is implemented by displaying a visually recognizable border, such as a speech bubble and the like, around each of the MS virtual elements that are enabled for SI. In another embodiment of the SISI framework the augmentation is implemented by highlighting each of the MS virtual elements that are enabled for SI to glow the aforementioned visually recognizable color. In yet another embodiment of the SISI framework the augmentation is implemented by both displaying a visually recognizable border around each of the MS virtual elements that are enabled for SI, and highlighting each of these virtual elements to glow the visually recognizable color.

Furthermore, the VC dictionaries associated with each of the system events that are sanctioned for SI can include one or more global VCs that when spoken and successfully recognized generally operate across the SISI framework. Examples of such global VCs include, but are not limited to, the following. If the user says "help" and it is successfully recognized by the system, the system can display a help GUI which provides the user with the ability to get more information about various SI topics. If the user says "configure" and it is successfully recognized by the system, the system can display a configuration GUI which provides the user with the ability to modify various aspects of how SI operates on the system. If the user says "pause speech interaction" and it is successfully recognized by the system, the system will pause the operation of SISI. If the user says "snooze all" and it is successfully recognized by the system, the system will snooze (in the manner described heretofore) each of the event notification GUIs that are currently displayed.

Additionally, rather than the system just visually providing the event notification to the user by displaying an event notification GUI as described heretofore, the system can also audibly provide the event notification to the user. In an exemplary embodiment of the SISI framework described herein the audible notification can be provided in conjunction with the GUI. The audible notification can be implemented in various ways. In one embodiment of the SISI framework the audible notification is implemented by playing an audibly recognizable sound (such as a ding, chime, and the like) which is intended to further draw the user's attention to the notification. In another embodiment of the SISI framework the audible notification is implemented by the system telling the user their options for SI.

It is also noted that any or all of the aforementioned embodiments can be used in any combination desired to form additional hybrid embodiments. Although the SISI framework embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Computing Environment

This section provides a brief, general description of a suitable computing system environment in which portions of the SISI framework embodiments described herein can be implemented. These SISI framework embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 9:
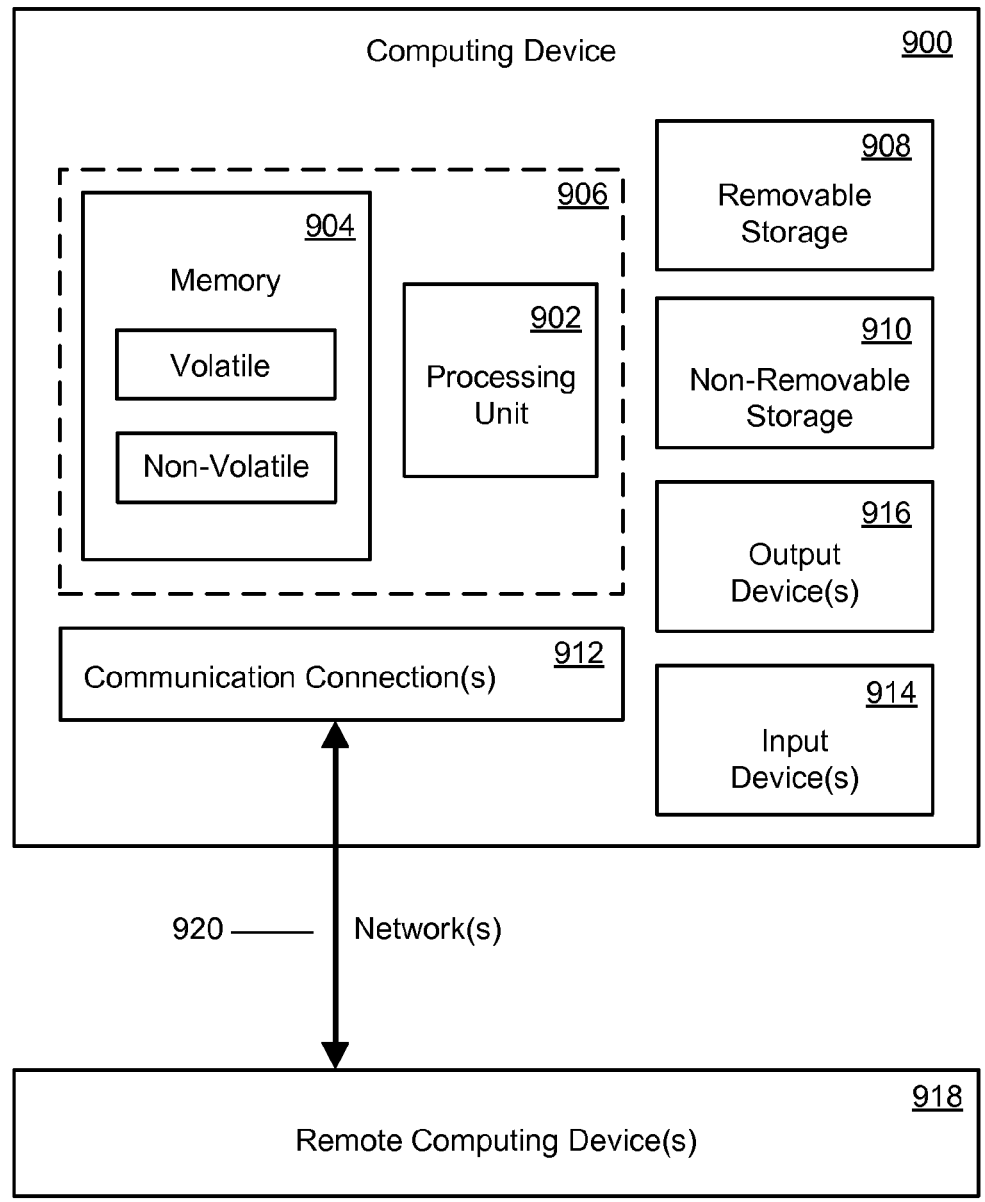
FIG. 9 is a diagram illustrating an exemplary embodiment, in simplified form, of a general purpose, network-based computing device which constitutes an exemplary system for implementing portions of the SISI framework embodiments described herein.

FIG. 9 illustrates an exemplary embodiment, in simplified form, of a suitable computing system environment according to the SISI framework embodiments described herein. The environment illustrated in FIG. 9 is only one example of a suitable computing system environment and is not intended to suggest any limitation as to the scope of use or functionality of the SISI framework embodiments described herein. Neither should the computing system environment be interpreted as having any dependency or requirement relating to any one or combination of components exemplified in FIG. 9.

As exemplified in FIG. 9, an exemplary system for implementing portions of the SISI framework embodiments described herein includes one or more computing devices, such as computing device 900. In its simplest configuration, computing device 900 typically includes at least one processing unit 902 and memory 904. Depending on the specific configuration and type of computing device, the memory 904 can be volatile (such as RAM), non-volatile (such as ROM and flash memory, among others) or some combination of the two. This simplest configuration is illustrated by dashed line 906.

As exemplified in FIG. 9, computing device 900 can also have additional features and functionality. By way of example, computing device 900 can include additional storage such as removable storage 908 and/or non-removable storage 910. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 900 such as computer readable instructions associated with an operating system, application programs and other program modules, and data structures, among other things. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 900. Any such computer storage media can be part of computing device 900.

As exemplified in FIG. 9, computing device 900 also includes a communications connection(s) 912 that allows the device to operate in a networked environment and communicate with a remote computing device(s), such as remote computing device(s) 918. Remote computing device(s) 918 can be a PC, a server, a router, a peer device, or other common network node, and typically includes many or all of the elements described herein relative to computing device 900. Communication between computing devices takes place over a network(s) 920, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 912 and related network(s) 920 described herein are exemplary and other means of establishing communication between the computing devices can be used.

As exemplified in FIG. 9, communications connection(s) 912 and related network(s) 920 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 9, computing device 900 also includes a user interface which includes one or more input devices 914 and one or more output devices 916. Exemplary input devices 914 include, but are not limited to, a keyboard, mouse, pen, touch input device, sound input device (such as a microphone and the like), and camera, among others. A user can enter commands and various types of information into the computing device 900 through the input device(s) 914. Exemplary output devices 916 include, but are not limited to, a display device(s), printer, and audio output devices, among others. These input and output devices are well known and need not be described at length here.

Referring again to FIG. 9, the SISI framework embodiments described herein can be further described and/or implemented in the general context of computer-executable instructions, such as program modules, which are executed by computing device 900. Generally, program modules include routines, programs, objects, components, and data structures, among other things, that perform particular tasks or implement particular abstract data types. The SISI framework embodiments can also be practiced in a distributed computing environment where tasks are performed by one or more remote computing devices 918 that are linked through a communications network 912/920. In a distributed computing environment, program modules can be located in both local and remote computer storage media including, but not limited to, memory 904 and storage devices 908/910.

Wherefore, what is claimed is:

1. A computer-implemented process for initiating speech interaction (SI) with a computer, comprising:
 using the computer to perform the following process actions:
 whenever an event occurs on the computer which will accept a response from a user of the computer, automatically determining whether or not to enable SI with the computer for the event response;
 whenever SI is enabled with the computer for the event response, providing a notification to the user which informs the user of the event and their options for responding thereto, wherein said options comprise responding verbally;
 whenever the user responds to the notification within a prescribed period of time, and whenever the user response comprises a voice command (VC),
 attempting to recognize the VC, and
 whenever the VC is successfully recognized,
 providing visual feedback to the user that their VC has been accepted,
 removing the event notification GUI for the current event from the display device,
 whenever the VC is not a snooze command, executing the VC, and
 whenever the VC is a snooze command,
 disabling the enabled SI with the computer,
 waiting an amount of time specified by the snooze command,
 again enabling SI with the computer using the VC dictionary associated with the current event, and
 again providing a notification to the user which informs the user of the current event and their options for responding thereto.

2. The process of claim 1, wherein the process action of automatically determining whether or not to enable SI with the computer for the event response comprises an action of, whenever the event is sanctioned for SI, enabling SI with the computer using a VC dictionary associated with the event.

3. The process of claim 2, wherein the process action of enabling SI with the computer using a VC dictionary associated with the event comprises the actions of:
 whenever SI with the computer is not already enabled for one or more previous events,
 initiating a speech recognition (SR) engine whenever said engine is not already initiated,
 initiating the VC dictionary associated with the current event, and starting SR using said dictionary; and
 whenever SI with the computer is already enabled for one or more previous events, and whenever no VCs in the VC dictionaries associated with said previous events are in the VC dictionary associated with the current event,
 initiating the VC dictionary associated with the current event, and
 starting SR using said dictionary.

4. The process of claim 2, wherein the VC dictionary associated with the event comprises a prescribed number of VCs which are specifically tailored to the event, and each VC comprises either a single word or a sequence of two or more words that are spoken by the user.

5. The process of claim 4, wherein the process action of providing a notification to the user which informs the user of the event and their options for responding thereto comprises an action of, whenever SI with the computer is not already enabled for one or more previous events, and whenever the current event is sanctioned for SI, displaying an event notification GUI for the current event within a new sector on the display device, wherein SI is enabled for said GUI and said GUI comprises one or more of the VCs in the VC dictionary associated with the current event.

6. The process of claim 5, further comprising the actions of:
whenever the user does not respond to the notification within the prescribed period of time:
removing the event notification GUI for the current event from the display device; and
disabling the enabled SI with the computer.

7. The process of claim 4, wherein the process action of providing a notification to the user which informs the user of the event and their options for responding thereto comprises the actions of:
whenever SI with the computer is already enabled for one or more previous events, and whenever no VCs in the VC dictionaries associated with said previous events are in the VC dictionary associated with the current event, displaying an event notification GUI for the current event within a new sector on the display device, wherein SI is enabled for said GUI, said GUI comprises one or more of the VCs in the VC dictionary associated with the current event, and said GUI shares voice input focus with one or more previous event notification GUIs that are associated with said previous events and that are already displayed in other sectors on the display device; and
whenever SI with the computer is already enabled for one or more previous events, and whenever one or more VCs in a VC dictionary associated with one of said previous events are in the VC dictionary associated with the current event, displaying an event notification GUI for the current event within a new sector on a display device of the computer, wherein SI is disabled for said GUI.

8. The process of claim 2, further comprising an action of, whenever the VC is successfully recognized, disabling the enabled SI with the computer.

9. The process of claim 8, wherein the process action of disabling the enabled SI with the computer comprises the actions of:
stopping speech recognition using the VC dictionary associated with the event; and
whenever an event notification graphical user interface (GUI) is displayed for another event that is sanctioned for SI, and whenever SI is currently disabled for said GUI, enabling SI with the computer using a VC dictionary associated with said other event.

10. The process of claim 2, further comprising the actions of:
whenever the VC is not successfully recognized, continuing to wait the prescribed period of time to receive another user response to the notification; and
whenever the user responds to the notification within the prescribed period of time, and whenever the user response comprises a non-voice command,
responding appropriately to the non-voice command, and
disabling the enabled SI with the computer.

11. The process of claim 2, wherein events that are sanctioned for SI comprise at least one of:
a user notification class of system events, wherein,
said notification class comprises events which are generated automatically by an application program running on the computer, and
whenever the event belongs to said notification class, the prescribed period of time is determined by the application program that generated the event; or
a user activity class of system events, wherein,
said activity class comprises events which are generated by user activity on the computer, and
whenever the event belongs to said activity class, the prescribed period of time will not terminate until the computer receives a user response to the notification.

12. The process of claim 11, wherein:
the events which are generated automatically by an application program running on the computer comprise at least one of an email toast, or a calendar reminder, or an instant message toast; and
the events which are generated by user activity on the computer comprise at least one of user authoring activity within an authoring application program running on the computer, or user file management activity.

13. The process of claim 2, wherein,
the computer comprises a default set of system events that are sanctioned for SI,
a default VC dictionary is associated with each event in the default set, and
the user performs at least one of the following actions:
sanctioning one or more additional system events for SI by adding said additional events to the default set; or
de-sanctioning one or more specific system events which are currently sanctioned for SI by removing said specific events from the default set; or
enabling the recognition of one or more new VCs by adding said new VCs to the default VC dictionary associated with a given event; or
disabling the recognition of one or more existing VCs by removing said existing VCs from the default VC dictionary associated with a given event.

14. In a computer system having a user interface comprising a display device and a sound input device, a computer-implemented process for initiating speech interaction (SI) with the computer, comprising:
using the computer to perform the following process actions:
displaying an event notification graphical user interface (GUI) within a new sector on the display device, wherein,
the GUI informs the user of an event that occurs on the computer and facilitates the user's response to the event,
whenever the event is sanctioned for SI, the new sector comprises a first subsector comprising one or more virtual elements, wherein each virtual element represents a different voice command (VC) in a VC dictionary associated with the event and each of the virtual elements comprises a speech bubble within which is displayed text associated with the VC represented by the virtual element, and
whenever the GUI has voice input focus, each speech bubble is highlighted to glow a visually recognizable color, wherein said glow provides a visual indication to the user that SI with the GUI is enabled and draws the user's attention to the VCs they can choose from; and
whenever the GUI has voice input focus, inputting a command spoken by the user into the sound input device in response to the GUI.

15. The process of claim 14, wherein the user interface further comprises a GUI selection device and the new sector further comprises at least one of:
- a second subsector comprising one or more information fields that identify the event to the user; and
- a third subsector comprising one or more manually-selectable (MS) virtual elements, wherein,
  - each of the MS virtual elements corresponds to a different speech bubble and provides the user with a way to activate the VC represented by its corresponding speech bubble using the GUI selection device,
  - within each of the MS virtual elements is displayed the same text that is displayed within its corresponding speech bubble, and
  - each of the speech bubbles comprises a shape which is different than the shape of any of the MS virtual elements.

16. The process of claim 14, wherein,
- the user interface further comprises a GUI selection device,
- each of the virtual elements comprises a manually-selectable (MS) element within which is displayed text associated with the VC represented by the virtual element,
- each MS element provides the user with a way to activate the VC whose text is displayed there-within using the GUI selection device, and
- the process action of displaying an event notification GUI comprises an action of, whenever the GUI has voice input focus, augmenting each MS element in a visually recognizable manner, wherein said augmentation provides a visual indication to the user that SI with the GUI is enabled and draws the user's attention to the VCs they can choose from, and said augmentation comprises one of the following actions:
  - displaying a visually recognizable border around the MS element; or
  - highlighting the MS element to glow a visually recognizable color; or
  - both displaying a visually recognizable border around the MS element and highlighting the MS element to glow a visually recognizable color.

17. The process of claim 14, further comprising an action of, whenever the command spoken by the user is successfully recognized by the computer, lighting up the virtual element that represents said recognized command for a short period of time in order to provide visual feedback to the user that their spoken command has been accepted.

18. A computer-implemented process for initiating speech interaction (SI) with a computer, comprising:
- using the computer to perform the following process actions:
- whenever an event occurs on the computer which will accept a response from a user of the computer, automatically determining whether or not to enable SI with the computer for the event response, said automatic determination comprising,
  - whenever the event is sanctioned for SI, and whenever SI with the computer is not already enabled for one or more previous events,
    - initiating a speech recognition (SR) engine whenever said engine is not already initiated,
    - initiating a voice command (VC) dictionary associated with the current event, and
    - starting SR using said dictionary, and
  - whenever the event is sanctioned for SI, and whenever SI with the computer is already enabled for one or more previous events, and whenever no VCs in the VC dictionaries associated with said previous events are in the VC dictionary associated with the current event,
    - initiating the VC dictionary associated with the current event, and
    - starting SR using said dictionary;
- providing a notification to the user which informs the user of the current event and their options for responding thereto, said providing comprising,
  - whenever SI with the computer is not already enabled for one or more previous events, and whenever the current event is sanctioned for SI, displaying an event notification graphical user interface (GUI) for the current event within a new sector on a display device of the computer, wherein SI is enabled for said GUI and said GUI comprises each VC in the VC dictionary associated with the current event, and
  - whenever SI with the computer is already enabled for one of more previous events, and whenever no VCs in the VC dictionaries associated with said previous events are in the VC dictionary associated with the current event, displaying an event notification GUI for the current event within a new sector on the display device, wherein SI is enabled for said GUI, said GUI comprises one or more of the VCs in the VC dictionary associated with the current event, and said GUI shares voice input focus with one or more previous event notification GUIs that are associated with said previous events and that are already displayed in other sectors on the display device;
- whenever the user responds to the notification within a prescribed period of time, and whenever the user response comprises a VC, attempting to recognize the VC using the SR engine; and
- whenever the VC is successfully recognized,
  - providing visual feedback to the user that their VC has been accepted,
  - removing the event notification GUI for the current event from the display device,
  - whenever the VC is not a snooze command, executing the VC,
  - stopping SR using the VC dictionary associated with the current event, and
  - whenever an event notification GUI is displayed for another event that is sanctioned for SI, and whenever SI is currently disabled for said GUI, initiating a VC dictionary associated with said other event, and starting SR using said dictionary.

* * * * *